United States Patent Office 2,762,849
Patented Sept. 11, 1956

2,762,849

PRODUCTION OF FLUOROHYDROCARBONS BY REACTING AN ACETYLINIC COMPOUND WITH HYDROGEN FLUORIDE AND BORON TRIFLUORIDE

Carl B. Linn, Riverside, Ill., assignor to Universal Oil Products Company, Des Plaines, Ill., a corporation of Delaware No Drawing. Application November 3, 1954,
Serial No. 466,697

7 Claims. (Cl. 260—653)

This invention relates to the production of fluorohydrocarbons, and more particularly to the production of vinyl fluorides and gem-difluoroalkanes.

It is an object of this invention to produce fluorohydrocarbons more cheaply and more easily than heretofore has been possible.

Vinyl fluorides and gem-difluoroalkanes have valuable commercial uses. Large quantities of vinyl fluorides of the general formula $RCF=CH_2$, wherein R is of the group consisting of hydrogen and hydrocarbon radicals, are used in the production of plastics and synthetic rubber. One method of preparing such compounds is to pass a mixture of acetylene and hydrogen fluoride over a solid catalyst. Many catalysts consisting of compounds of many metals and metal oxides, either alone or supported on suitable carriers, are known to catalyze the reaction between acetylene and hydrogen fluoride to produce vinyl fluoride. Most of these compounds are initially active catalysts, however, their activity drops off very rapidly, one of the reasons for this decline of catalyst activity being the contamination of the catalyst with high molecular weight hydrocarbons and fluorohydrocarbons which are formed. My process is superior to these other processes which employ solid catalysts in that my process employs a gaseous catalyst and the activity of this gaseous catalyst is not affected by a decline in activity as are the solid catalysts. With the reaction carried on in the gas phase the boron trifluoride may also be termed a homogeneous catalyst.

In one embodiment the present invention relates to the production of a fluorohydrocarbon which comprises reacting in the vapor phase, a mixture of an acetylenic hydrocarbon and hydrogen fluoride in the presence of boron trifluoride.

In a specific embodiment the present invention relates to the production of vinyl fluoride which comprises reacting in the vapor phase acetylene and hydrogen fluoride in the presence of boron trifluoride, at a temperature of from about 0° C. to about 400° C.

According to the present invention, therefore, an acetylenic hydrocarbon is reacted with hydrogen fluoride in the gaseous phase. The gas phase is necessary to obtain the desired reaction since the reaction in the liquid phase is almost negligible. These compounds may be represented by the general formula $RC\equiv CR'$, wherein R and R' are selected from the group consisting of hydrogen and hydrocarbon radicals. R and R' may be the same or different selections. Specific examples are acetylene, methylacetylene, ethylacetylene, dimethylacetylene, etc. Acetylenic hydrocarbons containing an olefinic group in addition to the acetylenic triple bond may also be used; such a compound is monovinylacetylene. Acetylenic hydrocarbons which contain less than ten carbon atoms per molecule are usually preferred since lighter weight hydrocarbons are more easily reacted in the vapor state. Higher molecular weight acetylenic hydrocarbons also tend to enter into other less desirable side reactions, however, if these other side reactions are not too objectionable higher molecular weight hydrocarbons may be used.

This presently taught process wherein an acetylenic triple bond may be catalytically hydrofluorinated in the gas phase, is not necessarily restricted to acetylenic hydrocarbons. Such compounds as chloroacetylene, 1-chloropropyne-1, 1-chloropropyne-3, propargyl alcohol and others wherein an acetylenic hydrocarbon contains additional functional parts such as halogen, hydroxyl, carboxyl, or olefinic groups may be employed. It will be apparent, however, that the respective boiling points of such compounds can effectively limit their obtainable vapor phase concentrations and accordingly limit their utility as a reactant in a vapor phase reaction.

The acetylenic compound is reacted with hydrogen fluoride, in the vapor phase, in the presence of a catalyst comprising boron trifluoride, and at a temperature within the range of from about 0° C. to about 400° C.

The catalyst, or boron trifluoride, is a gas at normal temperatures and boils at —101° C. at atmospheric pressure. Substantially anhydrous hydrogen fluoride is a liquid boiling at about 20° C. under an absolute pressure of one atmosphere. The boron trifluoride acts as a catalyst and is found unchanged after it brings about the hydrofluorination reaction. The amount of boron trifluoride used affects the rate of reaction of the hydrocarbon with the hydrogen fluoride to some degree. In general the amount of boron trifluoride used should be more than a trace amount and large amounts may also be used. In some cases the mols of boron trifluoride used may be greater than the mols of hydrogen fluoride in the reaction zone. The process of this invention may be effected at temperatures within the range of from about 0° C. to about 400° C. However, a preferred range is from about 70° C. to about 250° C., although this may vary depending upon the acetylenic compound employed. The ratio of hydrogen fluoride to the compound having the general formula $RC\equiv CR'$ may vary greatly, depending, in general, upon whether it is desired to add one or two hydrogen fluoride molecules to the acetylenic compound. Ratios of hydrogen fluoride to the compound having a general formula $RC\equiv CR'$ usually will lie within the range of from about 10:1 to 2:1 when complete hydrofluorination is desired, and from 2:1 to 0.5:1 when an unsaturated fluoride is to be the product, although in the case of a refractory compound higher HF/hydrocarbon ratios may be used because the slower reaction velocity allows the hydrofluorination to be easily terminated at the monofluoride stage.

The pressure used is such that the reactants and catalysts are kept substantially in the gaseous phase at the temperature employed. Pressures may range from subatmospheric to super-atmospheric, however, generally super-atmospheric pressures are used. As hereinbefore mentioned the process of this invention is particularly suitable for the preparation of vinyl fluoride, 1,1-difluoroethane and 2-fluorobutadiene-1,3. One preferred method of carrying out the invention comprises passing a mixture of hydrogen fluoride, boron trifluoride, and acetylene, in which the molar ratio of hydrogen fluoride to acetylene is within the range of from about 1.5:1 to 1:2, into a zone wherein the temperature is maintained at from about 70° C. to about 250° C. and the zone is maintained at substantially anhydrous conditions. By correlating the conditions of catalyst concentration, temperature, hydrogen to hydrocarbon mol ratio, and pressure, substantial yields of 1,1-difluoroethane may be produced. When the mol ratio of hydrogen fluoride to acetylene is about 1:1, a substantial yield of vinyl fluoride is produced. When the mol ratio is about 2:1 or greater, a substantial yield of 1,1-difluoroethane is produced.

Likewise, starting with a mixture of hydrogen fluoride, boron trifluoride, and monovinylacetylene, substantial amounts of 2-fluorobutadiene-1,3 may be produced.

For efficient operation, it is preferred that the reacting gases should not be allowed to mix until they enter the reaction chamber. If the hydrogen fluoride and acetylenic hydrocarbon are mixed before entering the reaction zone there may be a tendency for the acetylenic hydrocarbon to polyerize in the presence of the hydrogen fluoride with the net result being the production of less desirable hydrocarbons and less desirable fluorohydrocarbons. It is preferred that the reactants and boron trifluoride be introduced simultaneously but separately to the reaction zone. The boron trifluoride may be mixed with one or both of the reactants before introducing them to the reaction zone.

The process of the present invention may be carried out utilizing either batch or continuous type operations. In batch type operation the preferred procedure is to place a mixture of boron trifluoride and acetylenic hydrocarbon in the gas phase in a confined zone at reaction conditions and to introduce gradually thereto gaseous hydrogen fluoride. After a time of contact sufficient to effect substantially complete reaction of the hydrogen fluoride with the acetylenic hydrocarbon, the reaction mixture is separated into boron trifluoride, reactants and product. The used boron trifluoride and unchanged reactants may be utilized in a subsequent treatment.

The process may be made continuous by providing a reaction zone through which the reactants and catalyst are passed and in which sufficient time is given for the completion of the desired reaction. The products from such a reaction zone are then directed to a separation zone in which the desired products are separated from the unconverted reactants and catalyst. The recovered unconverted reactants and boron trifluoride are then recycled to further contact with the reactants being charged to the process.

The following examples are introduced to illustrate the process of this invention, though the examples given should not be construed to impose undue limitations upon the generally broad scope of the invention.

*Example I*

A 35 liter stainless steel reactor was evacuated to 3 mm. of Hg. 2.04 mols of hydrogen fluoride and 1.57 mols of boron trifluoride were introduced to the reaction zone. Acetylene was passed into the reactor slowly until 0.675 mol had been introduced. The reactor was sealed and maintained at 25° C. for approximately 264 hours. At the end of this time the contents of the reactor was purged out. An analysis of the product showed a substantial amount of vinyl fluoride and 1,1-difluoroethane in the product. On the basis of pressure data obtained it appeared that the reaction time allowed was much longer than necessary.

*Example II*

Another run was made at substantially the same conditions and in the same apparatus as noted above. In this run, however, the change was 0.665 mol of acetylene, 0.530 mol of hydrogen fluoride and 1.87 mols of boron trifluoride. In Example I the hydrogen fluoride to acetylene mol ratio was 2.04/0.675=3.0. In the present example the ratio was 0.530/0.665=0.8. It was expected that at this latter ratio substantially more vinyl fluoride and less 1,1-difluoroethane would result. The results showed that approximately three times as much vinyl fluoride was prepared at the ratios of this example than was prepared in Example I.

*Example III*

A 35 liter stainless steel reactor is evacuated to 10 mm. of Hg. 2.0 mols of hydrogen fluoride and 1.0 mol of boron trifluoride are introduced to the reaction chamber. Monovinylacetylene is then passed into the reactor until 2.0 mols are introduced. The reactor is sealed and maintained at 50° C. for approximately 24 hours. At the end of this time the reactor is purged and the contents removed. At these experimental conditions a substantial quantity of 2-fluorobutadiene-1,3 is produced.

I claim as my invention:

1. A process for the production of a fluoro-compound which comprises reacting in the vapor phase a mixture of acetylenic compound and hydrogen fluoride in the presence of boron trifluoride.

2. A process for the production of a fluorohydrocarbon which comprises reacting in the vapor phase a mixture of acetylenic hydrocarbon and hydrogen fluoride in the presence of boron trifluoride.

3. A process for the production of a fluorohydrocarbon which comprises reacting in the vapor phase a mixture of a hydrocarbon having the general formula $RC \equiv CR'$, R and R' being selected from the group consisting of hydrogen and hydrocarbon radicals, and hydrogen fluoride in the presence of boron trifluoride.

4. A process for the production of a fluorohydrocarbon which comprises reacting in the vapor phase a mixture of a hydrocarbon having the general formula $RC \equiv CR'$, R and R' being selected from the group consisting of hydrogen and hydrocarbon radicals and containing less than ten carbon atoms per molecule, and hydrogen fluoride in the presence of boron trifluoride.

5. A process for the production of a fluorohydrocarbon which comprises reacting in the vapor phase a mixture of a hydrocarbon having the general formula $RC \equiv CR'$, R and R' being selected from the group consisting of hydrogen and hydrocarbon radicals and containing less than ten carbon atoms per molecule, and hydrogen fluoride in the presence of boron trifluoride, at a temperature of from about 0° C. to about 400° C.

6. A process for the production of vinyl fluoride which comprises reacting in the vapor phase, acetylene and hydrogen fluoride in the presence of boron trifluoride, at a temperature of from about 0° C. to about 400° C.

7. A process for the production of 2-fluorobutadiene-1,3, which comprises reacting in the vapor phase monovinylacetylene and hydrogen fluoride in the presence of boron trifluoride, at a temperature of from about 0° C. to about 400° C.

References Cited in the file of this patent

UNITED STATES PATENTS

| | | |
|---|---|---|
| 2,469,848 | Salisbury | May 10, 1949 |
| 2,519,199 | Salisbury | Aug. 5, 1950 |
| 2,574,480 | Hillyer et al. | Nov. 13, 1951 |
| 2,626,963 | Clark | Jan. 27, 1953 |